United States Patent
Lin et al.

(10) Patent No.: US 9,284,424 B2
(45) Date of Patent: Mar. 15, 2016

(54) POLYIMIDE FILM AND FABRICATION METHOD THEREOF

(71) Applicants: Chih-Wei Lin, Hsinchu Hsien (TW); Meng-Ying Tsai, Hsinchu Hsien (TW)

(72) Inventors: Chih-Wei Lin, Hsinchu Hsien (TW); Meng-Ying Tsai, Hsinchu Hsien (TW)

(73) Assignee: TAIMIDE TECHNOLOGY INCORPORATION (TW)

( * ) Notice: Subject to any disclaimer, the term of this patent is extended or adjusted under 35 U.S.C. 154(b) by 0 days.

(21) Appl. No.: 14/249,702

(22) Filed: Apr. 10, 2014

(65) Prior Publication Data

US 2015/0018484 A1    Jan. 15, 2015

(30) Foreign Application Priority Data

Jul. 11, 2013 (TW) .............. 102124979 A

(51) Int. Cl.
| | | |
|---|---|---|
| *B32B 5/16* | (2006.01) | |
| *C08G 73/10* | (2006.01) | |
| *C08J 5/18* | (2006.01) | |
| *C08L 79/08* | (2006.01) | |
| *B29C 39/00* | (2006.01) | |
| *C09D 179/08* | (2006.01) | |
| *B29K 79/00* | (2006.01) | |
| *B29K 105/00* | (2006.01) | |

(52) U.S. Cl.
CPC ................ *C08J 5/18* (2013.01); *B29C 39/003* (2013.01); *C08G 73/1067* (2013.01); *C08G 73/1071* (2013.01); *C09D 179/08* (2013.01); *B29K 2079/08* (2013.01); *B29K 2105/0032* (2013.01); *C08J 2379/08* (2013.01)

(58) Field of Classification Search
None
See application file for complete search history.

(56) References Cited

U.S. PATENT DOCUMENTS

2013/0158195 A1 *  6/2013  Chen et al. ............... 524/600

FOREIGN PATENT DOCUMENTS

| JP | 08020721 | * | 1/1996 |
|---|---|---|---|
| TW | 201233548 | | 8/2012 |
| TW | 201321431 | | 6/2013 |

OTHER PUBLICATIONS

Machine translation of JP 08020721.*

* cited by examiner

*Primary Examiner* — Ana Woodward
(74) *Attorney, Agent, or Firm* — Baker & McKenzie LLP

(57) ABSTRACT

A polyimide film includes a polyimide polymer forming a main molecular structure of the polyimide film, and polyimide particles present in the polyimide film at a weight ratio between about 15 wt % and 30 wt % of a total weight of the polyimide film, the polyimide particles having an average diameter between about 3 μm and 8 μm. The polyimide film can have a 60° gloss value equal to or smaller than 10, a haze equal to or higher than 90%, and a Young's modulus equal to or higher than 280 kgf/mm². In some embodiments, methods of fabricating the polyimide film are also described.

13 Claims, 2 Drawing Sheets

| Example | Polyimide film | | Polyimide particles | | Particle size (μm) | Particle content (wt%) | Carbon black (wt%) | Hz (%) | TT (%) | 60° gloss (GU) | Young's modulus (kgf/mm²) |
|---|---|---|---|---|---|---|---|---|---|---|---|
| | Diamine | Dianhydride | Diamine | Dianhydride | | | | | | | |
| 2.1 | ODA | PMDA | ODA | PMDA | 3-5 | 15 | - | 95.6 | 63.4 | 9.8 | 284 |
| 2.2 | ODA | PMDA | ODA | PMDA | 3-5 | 20 | - | 97.8 | 59.6 | 7.3 | 285 |
| 2.3 | ODA | PMDA | ODA | PMDA | 3-5 | 22 | - | 98.2 | 58.6 | 5.1 | 289 |
| 2.4 | ODA | PMDA | ODA | PMDA | 3-5 | 25 | - | 98.2 | 59.4 | 3.5 | 280 |
| 2.5 | ODA | PMDA | ODA | PMDA | 3-5 | 28 | - | 99.1 | 59.1 | 3.2 | 285 |
| 2.6 | ODA | PMDA | ODA | PMDA | 3-5 | 30 | - | 98.6 | 58.5 | 3.1 | 282 |
| 2.7 | PDA | BPDA | ODA | PMDA | 3-5 | 25 | - | 97.8 | 58.6 | 4.3 | 824 |
| 2.8 | ODA | BPDA | ODA | PMDA | 3-5 | 25 | - | 98.6 | 56.4 | 4.7 | 412 |
| 2.9 | ODA | PMDA | ODA | PMDA | 6-8 | 25 | - | 98.5 | 58.2 | 3.2 | 285 |
| 2.10 | ODA | PMDA | ODA | PMDA | 3-5 | 25 | 1 | 98.5 | 0.2 | 2.8 | 285 |
| 2.11 | ODA | PMDA | ODA | PMDA | 3-5 | 25 | 4 | 99.2 | 0.1 | 2.5 | 281 |
| 2.12 | ODA | PMDA | ODA | BPDA | 3-5 | 25 | - | 97.1 | 59.3 | 3.3 | 290 |
| 2.13 | ODA | PMDA | PDA | BPDA | 3-5 | 25 | - | 98.2 | 60.2 | 2.8 | 301 |
| 2.14 | ODA | PMDA | PBOA | PMDA | 3-5 | 25 | - | 97.5 | 55.6 | 3.1 | 297 |

FIG. 1

| Comparative Example | Polyimide film | | Polyimide particles | | Particle size (μm) | Particle content (wt%) | Carbon black (wt%) | Hz (%) | TT (%) | 60° gloss (GU) | Young's modulus (kgf/mm²) |
|---|---|---|---|---|---|---|---|---|---|---|---|
| | Diamine | Dianhydride | Diamine | Dianhydride | | | | | | | |
| 2.1 | ODA | PMDA | - | - | - | - | - | 0.5 | 79.5 | 184 | 323 |
| 2.2 | PDA | BPDA | - | - | - | - | - | 0.7 | 79.2 | 218 | 880 |
| 2.3 | ODA | BPDA | - | - | - | - | - | 1.6 | 82.3 | 198 | 427 |
| 2.4 | ODA | PMDA | ODA | PMDA | 3-5 | 1 | - | 22.2 | 76.5 | 111 | 319 |
| 2.5 | ODA | PMDA | ODA | PMDA | 3-5 | 3 | - | 50.8 | 76.0 | 47.6 | 286 |
| 2.6 | ODA | PMDA | ODA | PMDA | 3-5 | 5 | - | 64.3 | 75.4 | 28.1 | 282 |
| 2.7 | ODA | PMDA | ODA | PMDA | 3-5 | 7 | - | 77.8 | 73.3 | 22.2 | 309 |
| 2.8 | ODA | PMDA | ODA | PMDA | 3-5 | 10 | - | 85.1 | 74.7 | 12.7 | 289 |
| 2.9 | ODA | PMDA | ODA | PMDA | 3-5 | 50 | - | 99.2 | 36.9 | 1.5 | 192 |
| 2.10 | ODA | PMDA | ODA | PMDA | 1-2 | 25 | - | 95.3 | 68.2 | 18 | 294 |
| 2.11 | ODA | PMDA | ODA | PMDA | 9-12 | 25 | - | 80.2 | 77.4 | 47 | 245 |

FIG. 2

POLYIMIDE FILM AND FABRICATION METHOD THEREOF

CROSS-REFERENCE TO RELATED APPLICATION

This application claims priority to Taiwan patent application No. 102124979 filed on Jul. 11, 2013.

BACKGROUND

1. Field of the Invention

The present invention relates to a polyimide film and a method of fabricating the same.

2. Description of the Related Art

Matte polymer films usually exhibit diffuse reflection and extinction effect. A matte film usually has a low gloss, a high haze, and soft light reflection. The matte film can offer certain properties such as comfortable tactile feeling and elegant appearance, which can be applied to electronic products, optical lens modules, LCD, advertising banners, packing materials and the like.

Polyimide films have a wide range of applications, one example of which is the flexible circuit board used in the optical lens module of a digital camera. The polyimide film used to make the flexible circuit board of the optical lens module needs to have a substantially dull surface to meet the optical requirement.

In order to reduce the gloss of the polyimide film, some approach may incorporate a delustrant into the polyimide film to increase its surface roughness, so that incident light can be scattered. Conventional delustrants may include inorganic and organic compounds. Examples of inorganic compounds used as delustrant can include silicon oxide, aluminum oxide, calcium carbonate, barium sulphate, and titanium dioxide. However, inorganic compounds may have a relatively high dielectric constant, which may result in poor insulation of the film.

Examples of organic compounds used as delustrant can include polycarbonate (PC), polystyrene (PS), polymethylmethacrylate (PMMA), polyethylene, polypropylene, polyethylene terephthalate (PET), and epoxy resin. However, the organic compound cannot tolerate a temperature above 250° C., which is approximately the temperature at which chemical conversion occurs in the fabrication of the polyimide film. As a result, the use of organic compounds may produce defects in the polyimide film such as cracks or apertures, or form spots of non-uniform color due to uneven melting of the delustrant during the fabrication process.

Therefore, there is a need for a polyimide film with desirable properties of gloss, and address at least the aforementioned issues.

SUMMARY

The present application describes a polyimide film and a method of fabricating the polyimide film. In some embodiment, the polyimide film includes a polyimide polymer forming a main molecular structure of the polyimide film, and polyimide particles present in the polyimide film at a weight ratio between about 15 wt % and 30 wt % of a total weight of the polyimide film, the polyimide particles having an average diameter between about 3 μm and 8 μm.

In other embodiments, the polyimide film contains a polyimide polymer forming a main molecular structure of the film, and polyimide particles distributed in the film, wherein the polyimide film has a 60° gloss value equal to or smaller than 10, a haze equal to or higher than 90%, and a Young's modulus equal to or higher than 280 kgf/mm$^2$.

In some embodiments, a method of fabricating the polyimide film includes preparing a slurry containing polyimide particles, the polyimide particles having an average diameter between about 3 μm and 8 μm, preparing a polyamic acid solution, coating a mixture containing the polyamic acid solution and the slurry on a support, and heating to form a polyimide film containing the polyimide particles, wherein the polyimide particles are present in the polyimide film at a weight ratio of about 15 wt % to 30 wt % of a total weight of the polyimide film.

Advantages of the polyimide film described herein includes a high haze, low gloss and good mechanical strength.

BRIEF DESCRIPTION OF THE DRAWINGS

FIG. 1 is a chart showing some characteristics of certain polyimide films fabricated according to a plurality of Examples described herein; and FIG. 2 is a chart showing the characteristics of certain polyimide films fabricated according to a plurality of Comparative Examples described herein.

DETAILED DESCRIPTION OF THE EMBODIMENTS

The present application describes a polyimide film that contains a polyimide polymer forming a main molecular structure of the film, and polyimide particles distributed in the film.

The polyimide polymer is obtained by reacting diamine monomers with dianhydride monomers at a substantially equal molar ratio (i.e., the diamine-to-dianhydride ratio is substantially equal to 1:1). Examples of the diamine monomers can include, without limitation, oxydianiline (ODA) (such as 4,4'-ODA, 3,3'-ODA and the like), phenylenediamine (PDA) (such as p-PDA, m-PDA), 2,2'-bis(trifluoromethyl)benzidine (TFMB), diaminodiphenyl sulfone (DDS), bis[4-(4-aminophenoxy)phenyl]hexafluoropropane (BDAF), bis(3-aminophenyl)hexafluoropropane, tetrafluoro-1,3-phenylenediamine, diaminocyclohexane (CHDA), cyclobutanediamine, tetramethylenediamine, hexanediamine, octamethylene diamine, dimethyldodecylamine and the like. Examples of the dianhydride monomers can include, without limitation, pyromellitic dianhydride (PMDA), 3,3',4,4'-biphenyltetracarboxylic dianhydride (BPDA), 2,2-bis[4-(3,4-dicarboxyphenoxy)phenyl]propane dianhydride (BPADA), oxydiphthalic anhydride (ODPA), 2,2'-bis(3,4-dicarboxyphenyl)hexafluoropropane dianhydride (6FDA), diphenylsulfone tetracarboxylic dianhydride (DSDA), bisphenol-a-bisether-4-phthalic dianhydride, cyclobutanetetracarboxylic dianhydride, aliphatic dianhydride, and the like.

The polyimide powder incorporated in the film can be used as a delustrant. The polyimide powder can be obtained by reacting diamine monomers with dianhydride monomers at a substantially equal molar ratio. The diamine monomers can be selected from phenylenediamine (PDA), oxydianiline (ODA) (such as 4,4'-ODA, 3,3'-ODA and the like), 2-(4-aminophenyl)-5-amino benzimidazole (PBOA), and any combination thereof. The dianhydride monomers can be selected from 3,3',4,4'-biphenyltetracarboxylic dianhydride (BPDA), pyromellitic dianhydride (PMDA), and the combination thereof. In some preferred embodiments, the polyimide powder can be formed by reacting ODA with PMDA, ODA with BPDA, PDA with BPDA, or PBOA with PMDA.

By adding polyimide powder as a delustrant into the film, uneven microstructures can be formed on the surface of the polyimide film, and light-scattering structures can be formed in the polyimide film. Accordingly, incident light can be effectively scattered to reduce the gloss and increase the haze of the polyimide film.

The polyimide powder can be comprised of polyimide particles having an average size or diameter between about 3 μm and 8 μm. For example, the average particle size in the polyimide powder can be about 3 μm, 4 μm, 5 μm, 6 μm, 7 μm, 8 μm, or any intermediate values between these values. More specifically, certain embodiments can have the average particle size between 3 and 5 μm, or between 6 and 8 μm.

The weight ratio of the polyimide powder contained in the polyimide film can be between about 15 and 30 wt % of the total weight of the polyimide film, preferably between about 20 and 28 wt %. For example, the weight ratio of polyimide particles contained in the polyimide film can be about 21 wt %, 22 wt %, 23 wt %, 24 wt %, 25 wt %, 26 wt %, 27 wt %, or a any intermediate values between these values.

The polyimide film can be transparent, and exhibit misted appearance with low gloss. In some embodiments, a color pigment can also be incorporated into the polyimide film to produce a desired color, for example red, blue, white, black, or yellow. The amount of the color pigment contained in the film can be between about 1 and 4 wt % of the total weight of the film.

The color pigment contained in the polyimide film can be organic pigment or inorganic pigment. Examples of the organic or inorganic pigment can include, without limitation, Cadmium Red, Cadmium Vermilion, Alizarin Crimson, Permanent Magenta, Van Dyke brown, Barium Lemon Yellow, Cadmium Yellow Lemon, Cadmium Yellow Light, Cadmium Yellow Middle, Cadmium Yellow Orange, Scarlet Lake, Raw Umber Greenish, Burnt Umber, and the like, which can be used individually or in combination.

The pigment may also be a black pigment formed by carbon micro-particles, a chrome black pigment, a titanium black pigment and the like. Examples of black pigments can include, without limitation, carbon black, titanium black, bone black, cyanine black, acetylene black, lamp black, graphite, iron black, aniline black, cyanine black, cobalt oxide, Fe—Mn—Bi black, Fe—Mn oxide spinel black, (Fe, Mn)$_2$O$_3$ black, copper chromite black spinel, hematite, iron oxide black, micaceous iron oxide, black complex inorganic color pigment (CICP), CuCr$_2$O$_4$ black, (Ni,Mn,Co)(Cr,Fe)$_2$O$_4$ black, perylene black, anthraquinone black, chrome green black hematite, iron-chromium mixed oxides and the like, which can be used individually or in combination. In one preferred embodiment, the black pigment can be a mixture of carbon black, titanium black, and perylene black.

The polyimide film has a gloss value at a 60° observation angle (also called "60° gloss value") that is equal to or less than 10, for example 9.8 or lower, and more preferably equal to or lower than 7.5. For instance, according to different embodiments of the polyimide film, the range of the 60° gloss value can be between about 3 and 10, between about 2 and 5, between about 2.5 and 3.5, or between about 4 and 6.

In addition to the aforementioned gloss characteristic, the polyimide film can have a haze equal to or higher than 90%, preferably equal to or above 95%, such as 97%, 98%, 99% or higher. Moreover, the polyimide film can have a mechanical strength characterized as a Young's modulus equal to or greater than 280 kgf/mm$^2$.

Methods for fabricating the polyimide powder delustrant and the low-gloss polyimide film are described in more details hereinafter with reference to the following Examples and Comparative Examples.

Preparation of the Polyimide Powder

Example 1.1

About 14.35 g of 4,4'-ODA can be reacted with about 15.65 g of PMDA (molar ratio 1:1) through a polymerization reaction conducted in about 470 g of a DMAC solvent to obtain a polyamic acid (PAA) solution. About 500 g of the PAA solution (solid content equal to about 6 wt %) then is added into a three-necked flask, agitated, heated to about 160° C. at a heating rate of about 2° C./min, and reacted for about 3 hours to form a precipitate of polyimide. The precipitate then can be rinsed by DMAC and ethanol, undergo vacuum filtration, and then heated at a temperature of about 160° C. in an oven for 1 hour to obtain a polyimide powder. The polyimide powder thereby produced can be comprised of polyimide particles having an average diameter of about 3-5 μm.

Example 1.2

A polyimide powder can be prepared like in Example 1.1 except that the heating rate is 0.6° C./min. The polyimide powder thereby obtained is comprised of polyimide particles having an average diameter of about 6-8 μm.

Example 1.3

A polyimide powder can be prepared like in Example 1.1 except that the ingredients include about 470 g of DMAC, about 12.15 g of 4,4'-ODA, and about 17.85 g of BPDA.

Example 1.4

A polyimide powder can be prepared like in Example 1.1 except that the ingredients include about 470 g of DMAC, about 8.06 g of PDA, and about 21.94 g of BPDA.

Example 1.5

A polyimide powder can be prepared like in Example 1.1 except that the ingredients include about 470 g of DMAC, about 15.24 g of PBOA, and about 14.76 g of PMDA.

Comparative Example 1.1

A polyimide powder can be prepared like in Example 1.1 except that the reacted monomers are 4,4'-ODA and 6FDA.

Comparative Example 1.2

A polyimide powder can be prepared like in Example 1.1 except that the reacted monomers are TFMB and PMDA.

Comparative Example 1.3

A polyimide powder can be prepared like in Example 1.1 except that the reacted monomers are TFMB and 6FDA.

Comparative Example 1.4

A polyimide powder can be prepared like in Example 1.1 except that the reacted monomers are 2,2-bis[4-(4-aminophenoxy)phenyl]propane (BAPP) and BPADA.

Table 1 below indicates the observation of polyimide particle precipitation in certain of the aforementioned Examples and Comparative Examples.

TABLE 1

|  | Applied monomers | | Polyimide particle precipitation |
|---|---|---|---|
|  | Diamine | Dianhydride |  |
| Example 1.1 | ODA | PMDA | ◎ |
| Example 1.3 | ODA | BPDA | ◎ |
| Example 1.4 | PDA | BPDA | ◎ |
| Example 1.5 | PBOA | PMDA | ◎ |
| Comparative Example 1.1 | ODA | 6FDA | X |
| Comparative Example 1.2 | TFMB | PMDA | X |
| Comparative Example 1.3 | TFMB | 6FDA | X |
| Comparative Example 1.4 | BAPP | BPADA | X |

In Table 1, the symbol "◎" means that spherical polyimide particles are formed, and the symbol "X" means that no polyimide particles are formed.

As shown in Table 1, not all combinations of diamine and dianhydride monomers can effectively produce a polyimide powder. In particular, precipitation of polyimide particles can occur in Examples 1.1 through 1.5, whereas no polyimide particle precipitation occurs in Comparative Examples 1.1 to 1.4. Moreover, the polyimide powder fabricated according to the Examples 1.1 through 1.5 can have an average particle diameter of about 3-5 μm, which may be advantageously used in the fabrication of polyimide films as described hereinafter.

Preparation of the Polyimide Film

Example 2.1

Under room temperature, the polyimide powder obtained from Example 1.1 can be mixed with a DMAC solvent at a weight ratio of about 1:6, and agitated for about 1 hour. The mixture then can be processed through a grinder to obtain a slurry containing polyimide particles.

About 35.89 g of 4,4'-ODA is reacted with about 39.12 g of PMDA (molar ratio equal to 1:1) in about 425 g of a DMAC solvent to obtain a PAA solution (solid content is equal to about 15 wt %). About 50 g of the PAA solution then can be mixed and agitated with about 8.34 g of the slurry containing the polyimide particles. The obtained mixture can be coated on a glass plate support and then baked in an oven. The baking condition can be set at a temperature of about 80° C. for 30 minutes to remove the solvent, and then between 170° C. and 370° C. for 4 hours to form a polyimide film. The polyimide film peeled from the glass plate support contains about 15 wt % of polyimide particles, and has a thickness equal to about 13 μm.

Example 2.2

A polyimide film is prepared like in Example 2.1 except that the amount of the slurry containing the polyimide particles is about 11.81 g, and the obtained polyimide film contains about 20 wt % of polyimide particles.

Example 2.3

A polyimide film is prepared like in Example 2.1 except that the amount of the slurry containing the polyimide particles is about 13.32 g, and the obtained polyimide film contains about 22 wt % of polyimide particles.

Example 2.4

A polyimide film is prepared like in Example 2.1 except that the amount of the slurry containing the polyimide particles is about 15.75 g, and the obtained polyimide film contains about 25 wt % of polyimide particles.

Example 2.5

A polyimide film is prepared like in Example 2.1 except that the amount of the slurry containing the polyimide particles is about 18.37 g, and the obtained polyimide film contains about 28 wt % of polyimide particles.

Example 2.6

A polyimide film is prepared like in Example 2.1 except that the amount of the slurry containing the polyimide particles is about 20.24 g, and the obtained polyimide film contains about 30 wt % of polyimide particles.

Example 2.7

A polyimide film is prepared like in Example 2.4 except that the PAA solution is obtained by reacting about 20.15 g of PDA with about 54.85 g of BPDA (molar ratio 1:1) in about 425 g of the DMAC solvent, which has 15 wt % of solid content. The obtained polyimide film contains about 25 wt % of polyimide particles.

Example 2.8

A polyimide film is prepared like in Example 2.4 except that the PAA solution is obtained by reacting about 30.36 g of PDA and about 44.64 g of BPDA (molar ratio 1:1) in about 425 g of the DMAC solvent, which has about 15 wt % of solid content. The obtained polyimide film contains about 25 wt % of polyimide particles.

Example 2.9

A polyimide film is prepared like in Example 2.4 except that the slurry containing the polyimide particles is prepared from the polyimide powder obtained from Example 1.2. The formed polyimide film contains about 25% of polyimide particles.

Example 2.10

Under room temperature, carbon black (sold by Cabot Company under the product designation "R400R") and the polyimide powder obtained from Example 1.1 are mixed in a DMAC solvent at a weight ratio of 1:25:156, which is agitated for 1 hour. The mixture then can be processed through a grinder to obtain a black slurry containing the polyimide particles.

A polyimide film is then prepared like in Example 2.1 except that 16.6 g of the above black slurry is used. The obtained polyimide film contains about 25 wt % of polyimide particles.

Example 2.11

A polyimide film is prepared like in Example 2.10 except that the black slurry has a weight ratio of carbon black:

polyimide particles:DMAC equal to about 4:25:174, and about 19.44 g of the black slurry is used to prepare the film. The obtained polyimide film contains about 25 wt % of polyimide particles and about 4 wt % of carbon black.

Example 2.12

A polyimide film is prepared like in Example 2.4 except that the slurry containing the polyimide particles is prepared from the polyimide powder obtained from Example 1.3. The formed polyimide film contains about 25 wt % of polyimide particles.

Example 2.13

A polyimide film is prepared like in Example 2.4 except that the slurry containing the polyimide particles is prepared from the polyimide powder obtained from Example 1.4. The formed polyimide film contains about 25 wt % of polyimide particles.

Example 2.14

A polyimide film is prepared like in Example 2.4 except that the slurry containing the polyimide particles is prepared from the polyimide powder obtained from Example 1.5. The formed polyimide film contains about 25 wt % of polyimide particles.

Comparative Example 2.1

About 35.89 g 4,4'-ODA is reacted with about 39.12 g of PMDA (molar ratio 1:1) in about 425 g of a DMAC solvent to obtain a PAA solution (solid content equal to about 15 wt %). The PAA solution is coated on a glass plate support, and then baked in an oven. The baking condition can be set to a temperature of about 80° C. for 30 minutes to remove the solvent, and then between 170° C. and 370° C. for 4 hours to form a polyimide film. The obtained film then can be peeled from the glass plate support.

Comparative Example 2.2

A polyimide film can be prepared like in Comparative Example 2.1 except that the reacted monomers are about 21.5 g of PDA and about 54.85 g of BPDA.

Comparative Example 2.3

A polyimide film can be prepared like in Comparative Example 2.1 except that the reacted monomers are about 30.36 g of ODA and about 44.64 g of BPDA.

Comparative Example 2.4

A polyimide film can be prepared like in Example 2.1 except that the amount of the slurry containing the polyimide particles is about 0.48 g. The obtained polyimide film contains about 1 wt % of polyimide particles.

Comparative Example 2.5

A polyimide film can be prepared like in Example 2.1 except that the amount of the slurry containing the polyimide particles is about 1.46 g. The obtained polyimide film contains about 3 wt % of polyimide particles.

Comparative Example 2.6

A polyimide film can be prepared like in Example 2.1 except that the amount of the slurry containing the polyimide particles is about 2.49 g. The obtained polyimide film contains about 5 wt % of polyimide particles.

Comparative Example 2.7

A polyimide film can be prepared like in Example 2.1 except that the amount of the slurry containing the polyimide particles is about 3.56 g. The obtained polyimide film contains about 7 wt % of polyimide particles.

Comparative Example 2.8

A polyimide film can be prepared like in Example 2.1 except that the amount of the slurry containing the polyimide particles is about 5.25 g. The obtained polyimide film contains about 10 wt % of polyimide particles.

Comparative Example 2.9

A polyimide film can be prepared like in Example 2.1 except that the amount of the slurry containing the polyimide particles is about 47.24 g. The obtained polyimide film contains about 50 wt % of polyimide particles.

Comparative Example 2.10

A polyimide powder can be prepared like in Example 1.1 except that the heating rate is about 3.7° C./min. The average particle diameter in the obtained polyimide powder is about 1-2 μm. A polyimide film then can be prepared like in Example 2.4, and the obtained polyimide film contains about 25 wt % of polyimide particles.

Comparative Example 2.11

A polyimide powder can be prepared like in Example 1.1 except that the applied heating rate is about 0.32° C./min. The average particle diameter in the obtained polyimide particle is about 10-13 μm. A polyimide film then can be prepared like in Example 2.4, and the obtained polyimide film contains about 25 wt % of polyimide particles.

The polyimide films prepared according to the aforementioned Examples and Comparative Examples can undergo testing to measure certain film characteristics including the haze (Hz), transparency (TT), 60° gloss value (GU) and Young's modulus. The results of the measures for the polyimide films fabricated according to the Examples 2.1 through 2.14 are shown in the chart of FIG. 1, and the results of the measures for the polyimide films fabricated according to Comparative Examples 2.1 through 2.11 are shown in the chart of FIG. 2.

The haze and transparency are detected by using a haze meter sold under the designation NIPPON DEMSHOKU NDH2000. Each of the haze and transparency values shown in the charts of FIGS. 1 and 2 is respectively derived as the average of three to six measure data.

The 60° gloss value is measured by using a gloss meter sold under the designation NIPPON DEMSHOKU PG-1M. Each 60° gloss value shown in the charts of FIGS. 1 and 2 is derived as the average of three to six measure data.

The Young's modulus is measured by using a universal testing machine sold under the designation Tinius Olsen H10KS based on the ASTM D 822 method. Each of the Young's modulus values shown in FIGS. 1 and 2 is derived as the average of five measure data.

The polyimide powder used in the Examples 2.1 through 2.14 can be formed by polymerization reaction of ODA with PMDA, ODA with BPDA, PDA with BPDA, or PBOA with PMDA. As shown in FIG. 1, adding 15-30 wt % of the polyimide powder having an average particle diameter of about 3-8 μm can produce a polyimide film with a high haze (higher than 95%), low gloss (lower than 10), and high mechanical strength (Young's modulus equal to or higher than 280 kgf/mm$^2$).

In addition to the polyimide powder, carbon black can be incorporated into the film (e.g., about 1 to 4 wt %) to form a black matte polyimide film, such as described in Examples 2.10 and 2.11. The black matte polyimide film thereby formed can have high haze, low gloss and high mechanical strength, and also exhibit good shading ability, e.g., having a transparency lower than 0.3%.

Referring to FIG. 2, the measures obtained for the polyimide films fabricated according to Comparative Examples 2.1 through 2.3 show that the polyimide films formed without addition of polyimide powder have an excessively high gloss (higher than 180) and a very low haze (less than 2). Moreover, the measures obtained for the films fabricated according to Comparative Examples 2.4 through 2.8 show that the polyimide films containing an insufficient amount of polyimide particles may also exhibit excessively high gloss and very low haze (less than 86%), even if the particle size is within the range of 3 to 8 μm. On the other hand, the polyimide film fabricated according to Comparative Example 2.9 exhibits a lower mechanical strength, i.e., significant reduction of the Young's modulus (less than 200 kgf/mm$^2$), which may be caused by an excessive amount of polyimide particles in the film. Such polyimide films cannot meet the requirement of current applications.

Further observation of the measures for the polyimide film fabricated according to Comparative Example 2.10 reveals that when the particle size of the added polyimide powder is about 1 to 2 μm and the amount of the polyimide powder is 25 wt %, the haze of the polyimide film is about 95%, but the 60° gloss value cannot be reduced to a desirable level, which results in high gloss of the film. As a result, the polyimide film fabricated according to Comparative Example 2.10 exhibits poor matting results.

With respect to the polyimide film fabricated according to Comparative Example 2.11, the use of polyimide powder having a particle size of about 9 to 12 μm can yield high gloss but a reduced haze. This may be caused by the aggregation of larger polyimide particles, which results in light leaking through interspace formed by the aggregated polyimide particles. Moreover, the polyimide film fabricated according to Comparative Example 2.11 does not exhibit a desirable mechanical strength.

The study of the measures shown in the charts of FIGS. 1 and 2 demonstrates that the desired film characteristics of haze, gloss and mechanical strength can be met when the polyimide film is fabricated under certain specific conditions. In particular, it is observed that the polyimide film can have a high haze, low gloss and good mechanical strength when polyimide powder is incorporated in the film in an amount between about 15 and 30 wt % and the average particle size of the polyimide powder is between about 3 and 8 μm. As described previously with reference to Table 1, such polyimide powder may be fabricated in a cost-effective manner through polymerization reaction of ODA with PMDA, ODA with BPDA, PDA with BPDA, or PBOA with PMDA.

Owing to an excellent heat resistance, the added polyimide particles may be relatively stable when subjected to the high temperature conditions (usually between 250 and 500° C.) under which the chemical conversion occurs in the fabrication of the polyimide film. Accordingly, the use of the polyimide powder as delustrant can prevent the formation of non-uniform color spots which may be caused by uneven melting of the conventional delustrants. Moreover, the presence of polyimide particles in the polyimide film can also lower the dielectric constant and provide better insulation properties, which may be particularly suitable for certain applications requiring high isolation.

Examples of applications for the polyimide films described herein can include, without limitation, flexible printed boards (FPC), rigid printed boards, flexible or rigid circuit boards, LCD, LED, photovoltaic cells, TFT-LCD, OLED, portable communication device, digital camera, laptop, e-book, tablet PC and the like.

Realizations of the polyimide films, polyimide powder delustrant and related fabrication methods have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A polyimide film comprising:
   a polyimide forming a molecular structure of the polyimide film; and
   polyimide particles distributed in the polyimide forming the molecular structure of the polyimide film, the polyimide particles having a weight ratio between about 15 wt % and about 30 wt % of a total weight of the polyimide film, the polyimide particles having an average diameter between about 3 μm and about 8 μm, and the polyimide particles being a reaction product of diamine monomers and dianhydride monomers, the diamine monomers being selected from the group consisting of phenylenediamine (PDA) and 2-(4-aminophenyl)-5-amino benzimidazole (PBOA), and the dianhydride monomers being selected from the group consisting of 3,3',4,4'-biphenyltetracarboxylic dianhydride (BPDA) and pyromellitic dianhydride (PMDA).

2. The polyimide film according to claim 1, having a 60° gloss value equal to or smaller than 10.

3. The polyimide film according to claim 1, having a haze equal to or higher than 90%.

4. The polyimide film according to claim 1, having a Young's modulus equal to or higher than 280 kgf/mm$^2$.

5. The polyimide film according to claim 1, having a 60° gloss value equal to or smaller than 10, a haze equal to or higher than 90%, and a Young's modulus equal to or higher than 280 kgf/mm$^2$.

6. The polyimide film according to claim 1, wherein the polyimide particles are present in the polyimide film in an amount between about 20 wt % and about 28 wt % of the total weight of the film.

7. The polyimide film according to claim 1, further comprising a color pigment.

8. The polyimide film according to claim 7, wherein the color pigment is present in an amount between about 1 wt % and about 4 wt % of the total weight of the polyimide film.

9. The polyimide film according to claim 7, wherein the color pigment is carbon black.

10. A polyimide film containing a polyimide forming a molecular structure of the polyimide film, and polyimide particles distributed in the polyimide forming the molecular structure of the polyimide film, wherein the polyimide film has a 60° gloss value equal to or smaller than 10, a haze equal to or higher than 90%, and a Young's modulus equal to or higher than 280 kgf/mm$^2$, and the polyimide particles are a reaction product of diamine monomers and dianhydride monomers, the diamine monomers being phenylenediamine (PDA), 2-(4-aminophenyl)-5-amino benzimidazole (PBOA) or a combination thereof, and the dianhydride monomers being 3,3',4,4'-biphenyltetracarboxylic dianhydride (BPDA), pyromellitic dianhydride (PMDA) or a combination thereof.

11. The polyimide film according to claim 10, wherein the polyimide particles are present in the polyimide film at a weight ratio between about 15 wt % and about 30 wt % of a total weight of the polyimide film, and the polyimide particles have an average diameter between about 3 μm and about 8 μm.

12. A polyimide film comprising:
a polyimide forming a molecular structure of the polyimide film; and
polyimide particles distributed in the polyimide forming the molecular structure of the polyimide film, the polyimide particles having a weight ratio between about 15 wt % and about 30 wt % of a total weight of the polyimide film, the polyimide particles having an average diameter between about 3 μm and about 8 μm, and the polyimide particles being a reaction product of diamine monomers and dianhydride monomers, the diamine monomers being phenylenediamine (PDA), 2-(4-aminophenyl)-5-amino benzimidazole (PBOA) or a combination thereof, and the dianhydride monomers being 3,3',4,4'-biphenyltetracarboxylic dianhydride (BPDA), pyromellitic dianhydride (PMDA) or a combination thereof.

13. The polyimide film according to claim 12, having a 60° gloss value equal to or smaller than 10, a haze equal to or higher than 90%, and a Young's modulus equal to or higher than 280 kgf/mm$^2$.

* * * * *